(12) United States Patent
Schad et al.

(10) Patent No.: US 11,376,773 B2
(45) Date of Patent: Jul. 5, 2022

(54) INJECTION UNIT FOR AN INJECTION MOLDING MACHINE

(71) Applicant: Niigon Machines Ltd., Vaughan (CA)

(72) Inventors: Robert D. Schad, Toronto (CA);
Patrick Roessler, Oakville (CA);
Brandon Winkels, Bolton (CA);
Jonathan Alt, Mississauga (CA);
Carsten Link, Burlington (CA)

(73) Assignee: Niigon Machines Ltd., Vaughan (CA)

( * ) Notice: Subject to any disclaimer, the term of this patent is extended or adjusted under 35 U.S.C. 154(b) by 301 days.

(21) Appl. No.: 16/811,034

(22) Filed: Mar. 6, 2020

(65) Prior Publication Data

US 2020/0206996 A1    Jul. 2, 2020

Related U.S. Application Data

(63) Continuation of application No. PCT/CA2018/051107, filed on Sep. 10, 2018.

(60) Provisional application No. 62/556,462, filed on Sep. 10, 2017.

(51) Int. Cl.
*B29C 45/50* (2006.01)
*B29C 45/17* (2006.01)

(52) U.S. Cl.
CPC .. *B29C 45/5008* (2013.01); *B29C 2045/1794* (2013.01); *B29C 2045/5024* (2013.01); *B29C 2045/5088* (2013.01)

(58) Field of Classification Search
CPC ........ B29C 45/5008; B29C 2045/1794; B29C 2045/5024; B29C 2045/5088

USPC ......................................................... 425/542
See application file for complete search history.

(56) References Cited

U.S. PATENT DOCUMENTS

| 4,105,147 | A | * | 8/1978 | Stubbe | ................... | B29C 45/52 |
| | | | | | | 222/413 |
| 6,068,810 | A | * | 5/2000 | Kestle | ................. | B29C 45/5008 |
| | | | | | | 366/78 |
| 2005/0048162 | A1 | * | 3/2005 | Teng | .................... | F15B 15/063 |
| | | | | | | 425/574 |
| 2010/0303949 | A1 | * | 12/2010 | Schad | ................. | B29C 45/5008 |
| | | | | | | 425/542 |
| 2013/0287885 | A1 | * | 10/2013 | Schad | ................. | B29C 45/1761 |
| | | | | | | 425/542 |

* cited by examiner

*Primary Examiner* — Hoang M Nguyen
(74) *Attorney, Agent, or Firm* — Bereskin & Parr LLP/S.E.N.C.R.L., s.r.l.

(57) ABSTRACT

An injection unit for an injection molding machine includes a cylindrical body rotatably supported in a housing interior for rotational coupling with a plasticizing screw. The cylindrical body is fixed to rotate with the plasticizing screw about an injection axis. A gear train in the housing includes a central gear mounted about, and fixed to rotate with, the cylindrical body, the central gear having an uppermost extent vertically above the injection axis and opposed first and second lateral extents on horizontally opposed sides of the injection axis. A rotary drive for powering rotation of the plasticizing screw includes a first motor having a first motor shaft rotatable about a first motor axis, the first motor axis parallel to the injection axis, the first motor axis at a first elevation below the uppermost extent of the central gear, and laterally outboard of the first lateral extent of the central gear.

20 Claims, 7 Drawing Sheets

INJECTION UNIT FOR AN INJECTION MOLDING MACHINE

This application is a continuation of International Application No. PCT/CA2018/051107, filed Sep. 10, 2018, which claims the benefit of Provisional Application Ser. No. 62/556,462, filed Sep. 10, 2017, which is hereby incorporated herein by reference.

FIELD

The specification generally relates to one or more apparatuses and methods associated with plasticizing and injecting mold material into a mold of an injection molding machine.

BACKGROUND

U.S. Pat. No. 8,087,919 (Schad et al.) discloses an injection drive unit including a hollow cylindrical cylinder rotatably supported by a housing, the cylindrical cylinder having an axis and a front end and a back end spaced apart along the axis; a piston in the cylindrical cylinder, the piston axially slidable relative to the cylindrical cylinder along the axis between advanced and retracted positions, and the piston rotationally locked with the cylindrical cylinder to rotate therewith; and a cylinder cap generally closing off the back end of the cylindrical cylinder and providing a first pressure chamber between the piston and the cylinder cap, the cylinder cap including a stationary part affixed to the housing and a rotary part affixed to the cylindrical cylinder, at least the stationary part providing a stationary end face opposed to the piston and against which fluid in the first pressure chamber bears when pressurized.

U.S. Pat. No. 7,316,553 (Teng et al.) discloses a drive assembly for rotating and translating a shaft comprising a hollow shaft motor and a fluid cylinder. The hollow shaft motor rotates the shaft and the fluid cylinder moves the shaft lengthwise. The drive is purportedly particularly useful in the injection unit of an injection-molding machine. In one preferred embodiment the injection unit includes a hollow electric motor and a hydraulic cylinder. A first cylinder wall of the hydraulic cylinder is joined to a rotor of the hollow motor. A second cylinder wall of the cylinder is connected to a stationary portion of the hollow motor. A piston has two end portions. One end portion of the piston engages the first cylinder wall and the other end portion of the piston engages the second cylinder wall. Means for rotating the piston are attached to the rotor. The means for rotating also permits the piston end portions to slide along the cylinder walls. One channel means provides hydraulic fluid to drive the piston in a forward direction and another channel means provides hydraulic fluid to drive the piston in a reverse direction. Means are provided for attaching an injection screw to the piston. In the preferred arrangement, the cylinder is at least partially situated within the hollow motor.

U.S. Pat. No. 4,105,147 (Stubbe) discloses an injection molding machine unit having a barrel, with an injection nozzle on one end of the barrel and a screw ram movable in the barrel, a valve member with axially extending grooves in the periphery thereof, supported on the ram shaft, a ring on the ram shaft adjacent the valve. The ring has axially extending grooves in its outer periphery and the ring moves out of alignment with the grooves in the valve. The grooves of the ring form a fluid flow passage for plastic material to the injection nozzle when the screw is rotated and the ram is retracted. The valve closes when the ram moves forward.

U.S. Pat. App. Pub. No. 2007/0195640 (Leonardis et al.) discloses a device for moving in the longitudinal direction a shaft with screw rotationally driven by a motor, comprising at least one cylinder coaxial with said shaft and provided with at least one rotating piston rigidly connected to the shaft and able to produce a displacement in either direction of the shaft from a first retracted end-of-travel position into a second advanced end-of-travel position, and vice versa.

SUMMARY

The following summary is intended to introduce the reader to various aspects of the applicant's teaching, but not to define any invention.

According to some aspects, an injection unit for an injection molding machine includes: (a) a housing; (b) a first cylinder rotatably supported in the housing for rotation about a cylinder axis; and (c) a shaft coaxial with the cylinder axis and axially fixed relative to the housing. The shaft has a shaft back end proximate a housing back end of the housing and a shaft front end spaced axially forward of the shaft back end along the cylinder axis. The injection unit further includes (d) a moving piston slidably received in a first annular space radially intermediate the first cylinder and the shaft. The piston includes a second cylinder coaxial with the axis and having a second cylinder front end for connection to a plasticizing screw and a second cylinder back end spaced axially rearward of the second cylinder front end. The piston further includes a first piston head received in sealed sliding fit in the first annular space and affixed to the second cylinder back end. The piston is fixed to rotate with the first cylinder and is translatable relative to the first cylinder along the axis between advanced and retracted positions. The injection unit further includes (e) a first pressure chamber in the first annular space axially rearward of the first piston head for urging the piston toward the advanced position when pressurized; (f) a second piston head received in sealed sliding fit in an interior of the second cylinder and affixed to the shaft front end; and (g) a second pressure chamber axially forward of the first piston head and in a second annular space radially intermediate the shaft and the second cylinder, the second pressure chamber bounded axially by the first and second piston heads for urging the piston toward the retracted position when pressurized.

In some examples, the first cylinder has a first cylinder inner surface, and the shaft has a shaft outer surface directed toward the first cylinder inner surface. The shaft outer surface and the first cylinder inner surface are spaced radially apart to form the first annular space therebetween. The first piston head is in sealed sliding engagement with the first cylinder inner surface and with the shaft outer surface.

In some examples, the second cylinder has a second cylinder inner surface directed toward and spaced radially apart from the shaft outer surface to form the second annular space therebetween, and the second piston head is in sealed sliding engagement with the second cylinder inner surface.

In some examples, when the piston is in the advanced position, the first piston head is axially proximate the second piston head, and when the piston is in the retracted position, the first piston head is spaced away from the second piston head toward the shaft back end.

In some examples, the shaft has an internal first fluid conduit extending between the first pressure chamber and a first fluid port proximate the shaft back end for conducting pressurized fluid to and from the first pressure chamber, and an internal second fluid conduit extending between the second pressure chamber and a second fluid port for conducting pressurized fluid to and from the second pressure chamber. In some examples, the second fluid conduit extends through the first pressure chamber for fluid communication with the second pressure chamber. In some examples, the first and second fluid ports are proximate the shaft back end. In some examples, the first and second fluid ports are external the housing.

In some examples, the injection unit further includes a gear train supported in the housing for transmitting power from a rotary drive to rotation of the first cylinder about the axis, and a gear oil chamber internal the housing for containing gear oil to lubricate the gear train. In some examples, the piston is fixed to rotate with the first cylinder through a spline coupling therebetween, and the spline coupling is in fluid communication with the gear oil chamber for lubrication thereof.

In some examples, the injection unit further includes a cylinder cap mounted to a first cylinder back end of the first cylinder and fixed to rotate with the first cylinder, and the first pressure chamber is bounded axially by the first piston head and the cylinder cap.

According to some aspects, an injection unit for an injection molding machine includes (a) a housing; (b) a first cylinder rotatably supported in the housing for rotation about a cylinder axis; and (c) a piston slidably received in the first cylinder. The piston includes a second cylinder having a second cylinder front end for connection to a plasticizing screw and a second cylinder back end spaced axially rearward of the second cylinder front end. The piston further includes a first piston head in the first cylinder and affixed to the second cylinder back end. The piston is fixed to rotate with the first cylinder and translatable relative to the first cylinder along the axis between advanced and retracted positions. The injection unit further includes (d) a first pressure chamber in the first cylinder axially rearward of the first piston head for urging the piston toward the advanced position when pressurized; and (e) a second pressure chamber in the second cylinder axially forward of the first piston head for urging the piston toward the retracted position when pressurized.

In some examples, the injection unit further includes a second piston head in the second cylinder and axially fixed relative to the housing. The second pressure chamber is bounded axially by the first and second piston heads.

In some examples, the injection unit further includes a shaft coaxial with the cylinder axis and axially fixed relative to the housing. The shaft extends through the first pressure chamber and a through-hole in the first piston head between a shaft back end axially rearward of the first piston head and a shaft front end axially forward of the first piston head and in the second cylinder. The second piston head is affixed to the shaft front end.

In some examples, the piston is slidably received in a first annular space radially intermediate the first cylinder and the shaft, and the first pressure chamber is in the first annular space.

In some examples, the second pressure chamber is in a second annular space radially intermediate the shaft and the second cylinder.

According to some aspects, an injection unit for an injection molding machine includes: (a) a housing; and (b) a cylinder rotatably supported in the housing for rotation about a cylinder axis. The cylinder has a cylinder front end and a cylinder back end spaced apart from the cylinder front end along the axis. The injection unit further includes (c) a cylinder cap mounted to the cylinder back end and fixed to rotate with the cylinder; and (d) a piston slidably received in the cylinder for connection to a plasticizing screw. The piston is fixed to rotate with the cylinder and translatable relative to the cylinder along the cylinder axis between advanced and retracted positions. The injection unit further includes (e) a pressure chamber in the cylinder and bounded axially by the piston and the cylinder cap for accommodating pressurized fluid to exert an axial force against the piston and urge the piston toward the advanced position, with the pressurized fluid exerting a reactionary force against the cylinder cap; and (f) a bearing assembly mounted between the housing and the cylinder. The bearing assembly supports rotation of the cylinder relative to the housing, and the bearing assembly transfers at least a portion of the reactionary force from the cylinder cap to the housing.

In some examples, the bearing assembly includes a thrust bearing axially forward of the cylinder cap for transferring at least a portion of the reactionary force from the cylinder cap to the housing.

In some examples, when the piston is in the advanced position, the thrust bearing is axially forward of a rear face of the piston.

In some examples, the thrust bearing is proximate the cylinder front end, and axially captive between a cylinder bearing surface fixed relative to the cylinder and directed toward the cylinder back end, and a housing bearing surface fixed relative to the housing and directed toward the cylinder bearing surface.

In some examples, the housing has a housing front end and a housing back end axially rearward of the housing front end, and the thrust bearing is mounted proximate the housing front end.

In some examples, the injection unit further includes a gear train supported in the housing for transmitting power from a rotary drive to rotation of the cylinder about the cylinder axis. The gear train includes a cylinder gear mounted on the cylinder coaxial with the cylinder axis, and fixed to rotate with the cylinder for driving rotation thereof.

In some examples, the bearing assembly includes at least one front bearing proximate the cylinder front end and a rear bearing spaced axially apart from the front bearing toward the cylinder back end, and the cylinder gear is axially intermediate the front and rear bearings.

In some examples, when the piston is in the advanced position, the cylinder gear and the pressure chamber axially overlap, and the piston is axially forward of the cylinder gear.

In some examples, when the piston is in the retracted position, the cylinder gear and the piston axially overlap, and the pressure chamber is axially rearward of the cylinder gear.

According to some aspects, an injection unit for an injection molding machine includes: (a) a housing; (b) a cylinder rotatably supported in the housing for rotation about a cylinder axis; and (c) a piston slidably received in the cylinder for connection to a plasticizing screw. The piston is fixed to rotate with the cylinder and is axially slidable relative to the cylinder along the cylinder axis between advanced and retracted positions. The injection unit further includes (d) a pressure chamber in the cylinder axially rearward of the piston for urging the piston toward the advanced position when pressurized; and (e) a rotary drive mounted to the housing for powering rotation of the cylinder. The rotary drive includes a first motor having a first motor shaft rotatable about a first motor axis. The first motor axis is parallel to the cylinder axis. The injection unit further includes (f) a gear train supported in the housing for transmitting power from the rotary drive to rotation of the cylinder. The gear train includes a cylinder gear mounted on the cylinder coaxial with the cylinder axis and fixed to rotate with the cylinder. The cylinder gear has an uppermost extent vertically above the cylinder axis and opposed first and second lateral extents on horizontally opposed sides of the cylinder axis. The first motor axis is at an elevation below the uppermost extent of the cylinder gear, and laterally beyond the first lateral extent of the cylinder gear.

In some examples, the rotary drive includes a second motor having a second motor shaft rotatable about a second motor axis parallel to the cylinder axis. The second motor axis is at an elevation below the uppermost extent of the cylinder gear, and laterally beyond the second lateral extent of the cylinder gear.

In some examples, the plasticizing screw is received within a barrel, and the housing is fixed relative to the barrel and remains generally stationary during normal machine operation.

In some examples, the injection unit further includes a gear oil chamber internal the housing for containing gear oil to lubricate the gear train, and the piston is fixed to rotate with the cylinder through a spline coupling therebetween. The spline coupling is in fluid communication with the gear oil chamber for lubrication thereof.

In some examples, the injection unit further includes a bearing assembly mounted between the housing and the cylinder for supporting rotation of the cylinder relative to the housing. The bearing assembly includes at least one front bearing mounted proximate a cylinder front end of the cylinder and a rear bearing spaced apart from the front bearing along the cylinder axis toward a cylinder back end of the cylinder. The cylinder gear is axially intermediate the front and rear bearings.

In some examples, when the piston is in the advanced position, the cylinder gear and the pressure chamber axially overlap, and the piston is axially forward of the cylinder gear.

In some examples, when the piston is in the retracted position, the cylinder gear and the piston axially overlap, and the pressure chamber is axially rearward of the cylinder gear.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim, or dedicate to the public any such invention by its disclosure in this document.

Figure 1:
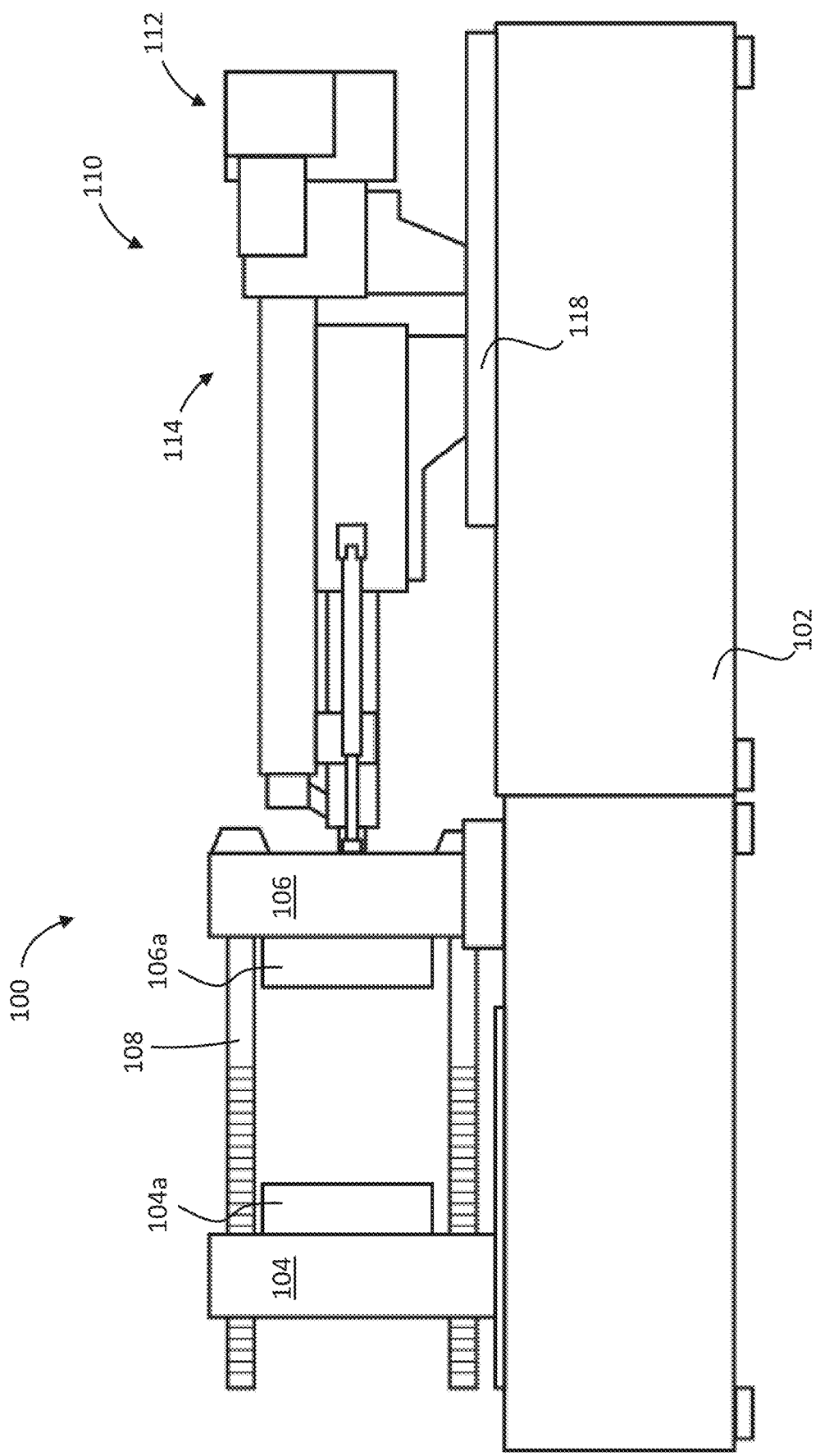
FIG. 1 is a schematic elevation view of an injection molding machine.

Referring to FIG. 1, an example of an injection molding machine 100 includes a base 102, with a moving platen 104 and a stationary platen 106 mounted to the base 102 and coupled together via tie bars 108. A mold is formed between the platens 104, 106, the mold defined at least in part by a first mold half 104a mounted to the moving platen 104, and a second mold half 106a mounted to the stationary platen 106.

An injection unit 110 is mounted to the base 102 for plasticizing and injecting resin or other mold material into the mold to form a molded article. The injection unit 110 includes a housing 112 (also referred to as a gearbox housing 112) and a barrel 114 (also referred to as a barrel housing 114) extending from the housing 112 towards the mold. A plasticizing screw 116 (FIG. 4A) is received within the barrel 114. The barrel 114 can be mounted on a carriage slide 118 for advancing the barrel 114 toward, and retracting the barrel 114 from, the mold. This can facilitate, for example, access to the screw 116 for maintenance purposes.

Figure 2:
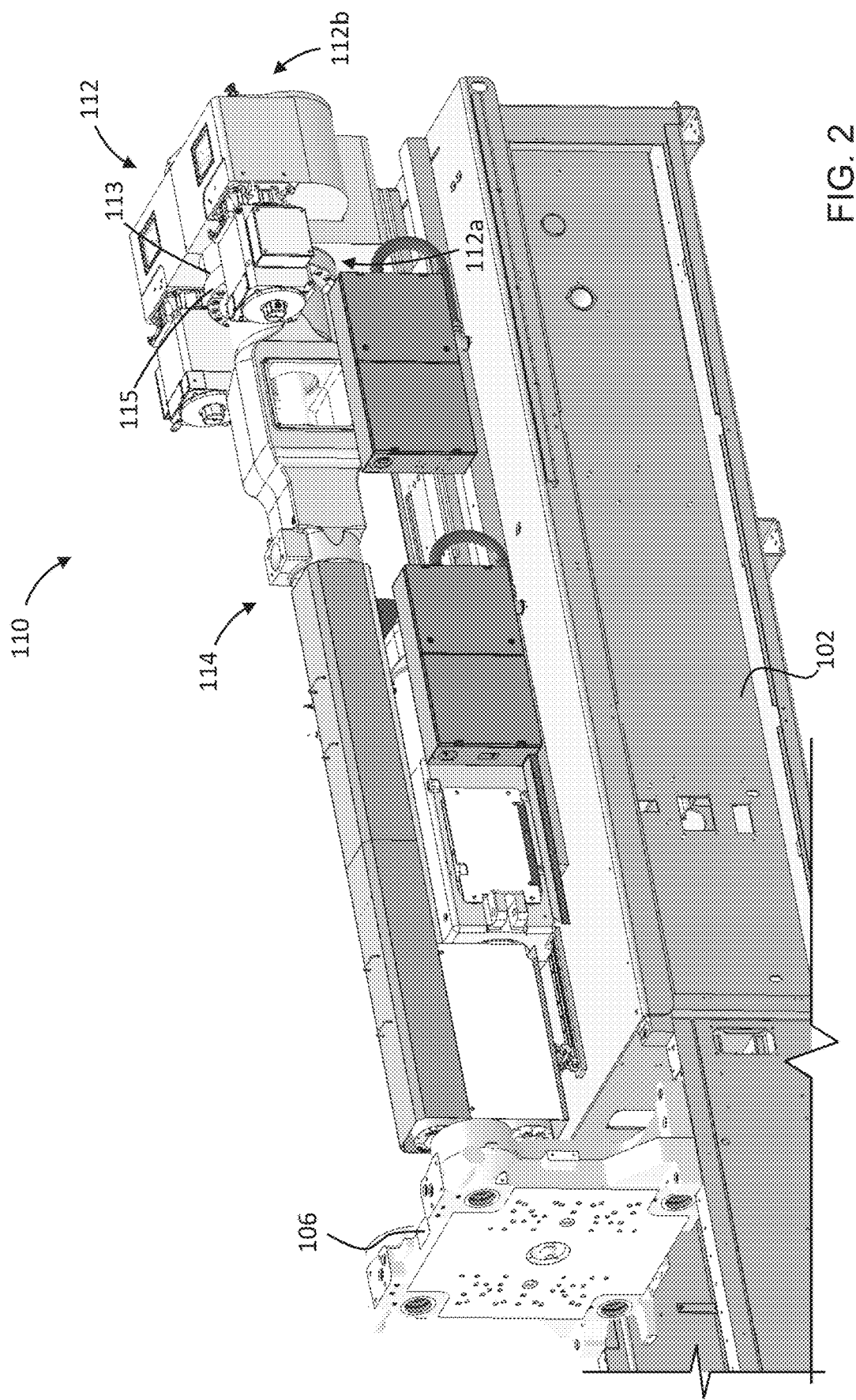
FIG. 2 is a perspective view of an injection unit of the machine of FIG. 1.
Figure 3:
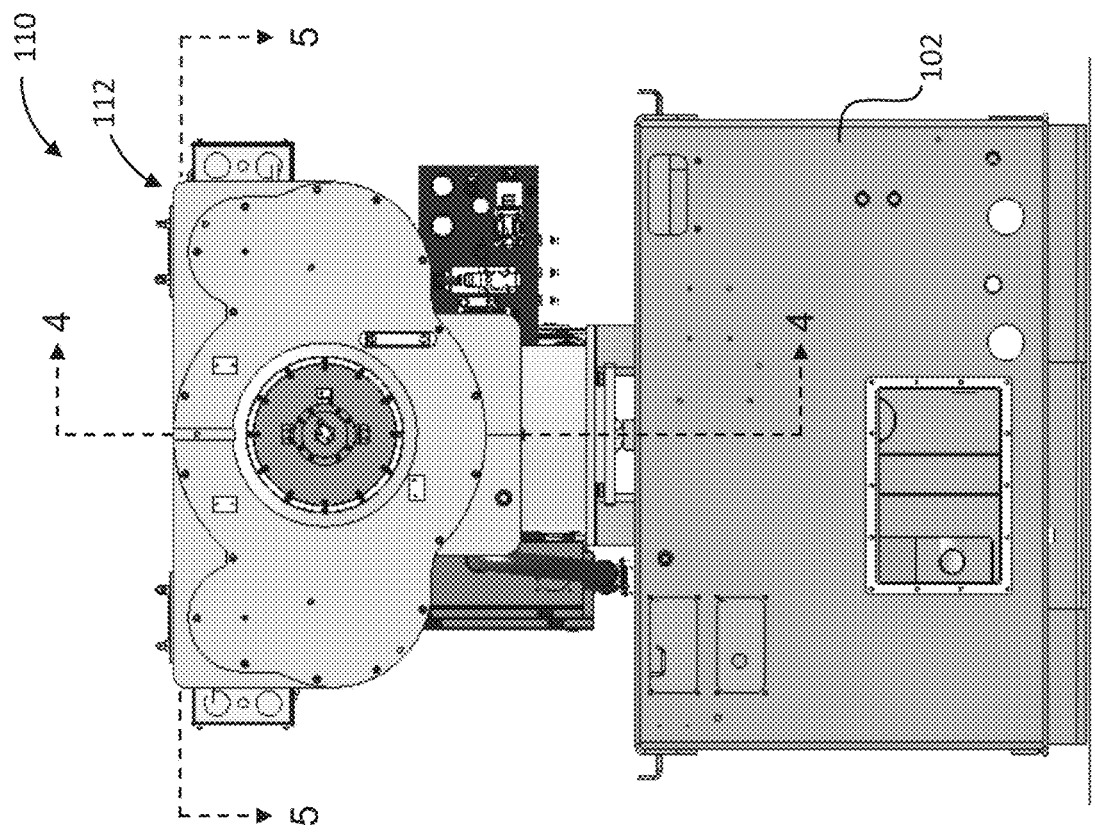
FIG. 3 is a rear view of the injection unit of FIG. 2.

Referring to FIG. 2, in the example illustrated, the housing 112 is fixed relative to the barrel 114, and remains generally stationary during normal machine operation. This can help reduce, and in some cases eliminate, the need for safety guarding around the housing 112. In the example illustrated, the barrel 114 includes a rear mounting flange 115. The housing 112 includes a housing front end 112a having a front mounting flange 113 and a housing back end 112b spaced axially rearward of the housing front end 112a away from the mold. The front mounting flange 113 of the housing 112 is joined to the rear mounting flange 115 of the barrel 114. Through this connection, an entire weight of the gearbox housing 112 can be borne by the barrel housing 114.

Figure 4A:
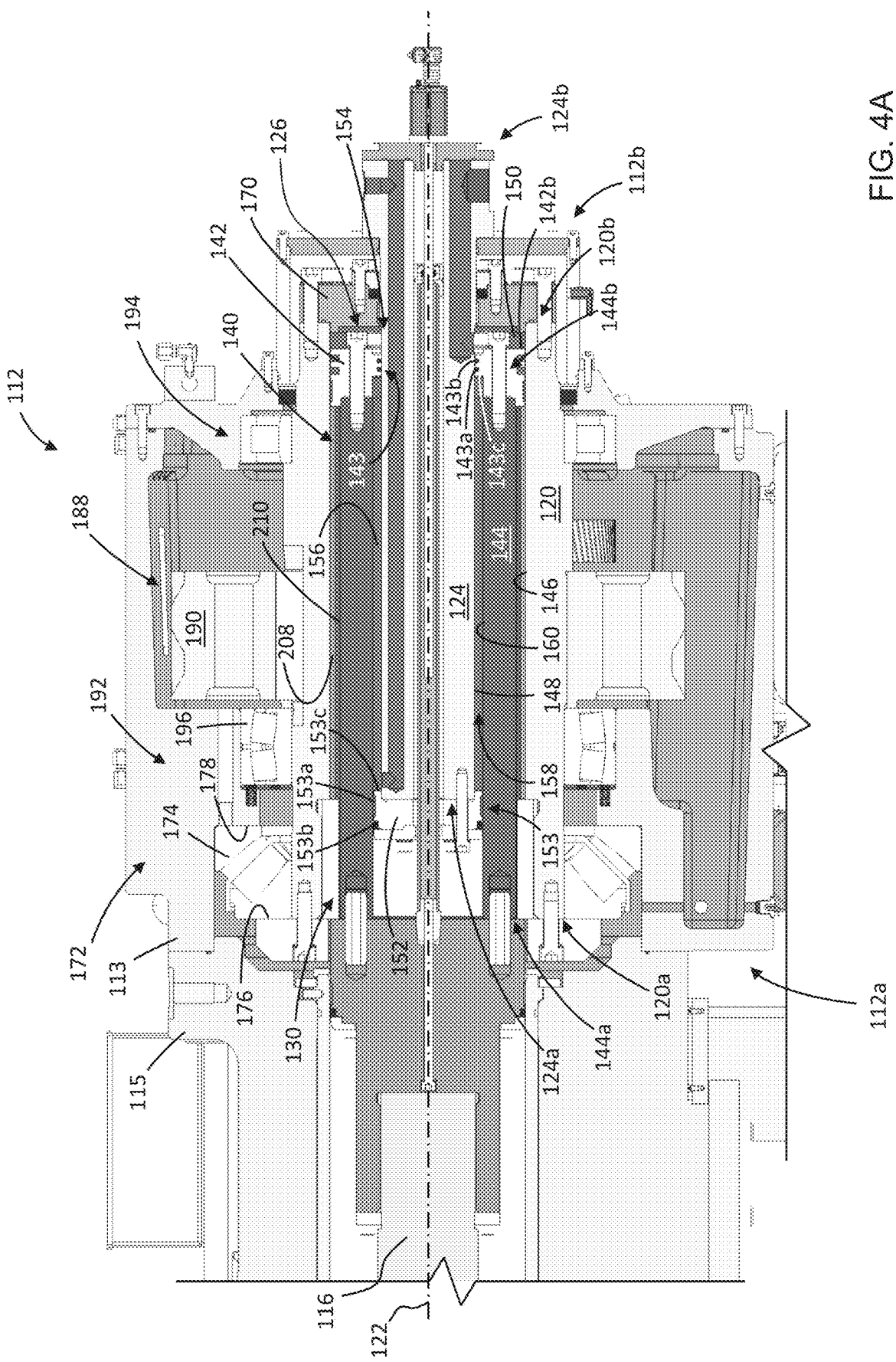
FIG. 4A is a cross-sectional side view of a portion of the injection unit of FIG. 2 taken along line 4-4 of FIG. 3, and showing a piston assembly of the injection unit in a retracted condition.

Referring to FIG. 4A, in the example illustrated, a first cylinder 120 is rotatably supported in the housing 112 for rotation about a cylinder axis 122. The first cylinder 120 has a first cylinder front end 120a and a first cylinder back end 120b spaced apart from the first cylinder front end 120a along the cylinder axis 122.

In the example illustrated, the injection unit 110 includes a shaft 124 coaxial with the cylinder axis 122 and axially fixed relative to the housing 112. The shaft 124 has a shaft back end 124b proximate the housing back end 112b, and a shaft front end 124a spaced axially forward of the shaft back end 124b along the cylinder axis 122. In the example illustrated, the shaft has a shaft rear portion proximate the shaft back end 124b that is fixed to the housing back end 112b.

Figure 4B:
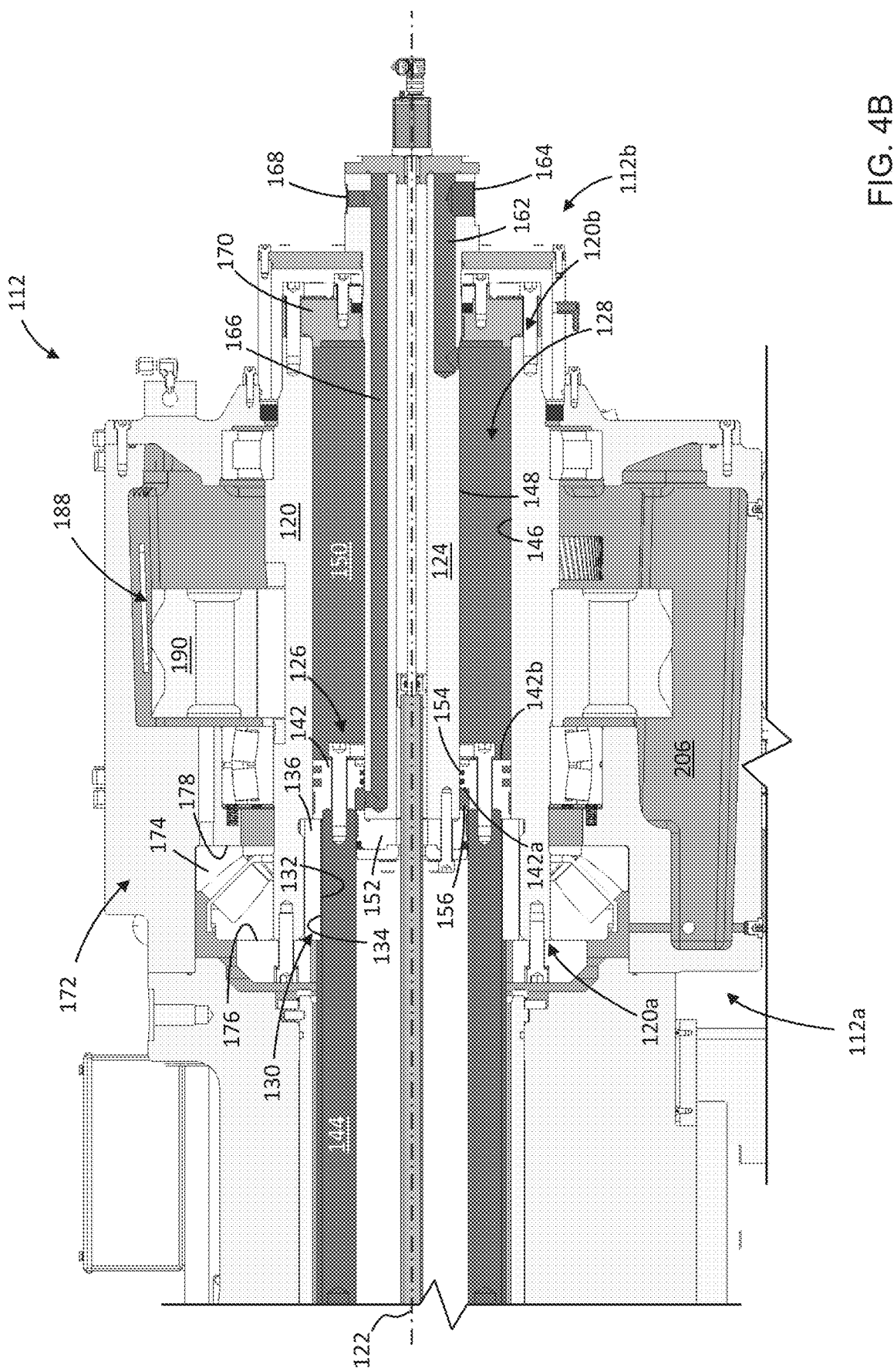
FIG. 4B is a cross-sectional side view like that of FIG. 4A, but showing the piston assembly in an advanced condition.

In the example illustrated, a piston 126 (also referred to as a moving piston 126) is slidably received in the first cylinder 120 for connection to the plasticizing screw 116. In the example illustrated, the piston 126 is slidably received in a first annular space 128 (FIG. 4B) radially intermediate the first cylinder 120 and the shaft 124. The piston 126 is fixed to rotate with the first cylinder 120, and is translatable relative to the first cylinder 120 along the cylinder axis 122 between a retracted position (FIG. 4A) and an advanced position (FIG. 4B). The advanced position can be defined by abutment of the piston 126 (or an element fixed thereto) against a hard stop axially fixed relative to the cylinder, and can be the same during each machine cycle. The retracted position can be defined by the shot volume, and can vary depending on, for example, the amount of melt required for a machine cycle. In some instances, the piston can be retracted to a maximum retracted position (furthest from the advanced position) in which further rearward translation of the piston is inhibited by engagement with, for example, a cylinder cap 170.

In the example illustrated, the piston 126 is fixed to rotate with the first cylinder 120 through a spline coupling 130 therebetween. Referring to FIG. 4B, in the example illustrated, the spline coupling 130 comprises an inner spline surface 132 fixed relative to the first cylinder 120, and an outer spline surface 134 fixed relative to the piston 126. In the example illustrated, the inner spline surface 132 comprises a spline sleeve 136 fixed to the first cylinder 120 proximate the first cylinder front end 120a.

Referring to FIG. 4A, in the example illustrated, the piston 126 includes a piston body 140 and a first piston head 142 in the first cylinder 120 and affixed to the piston body 140. In the example illustrated, the first piston head 142 is received in sealed sliding fit in the first annular space 128 (FIG. 4B).

In the example illustrated, the piston body 140 includes a second cylinder 144 coaxial with the cylinder axis 122. The second cylinder 144 has a second cylinder front end 144a for connection to the plasticizing screw 116, and a second cylinder back end 144b spaced axially rearward of the second cylinder front end 144a. The first piston head 142 is affixed to the second cylinder back end 144b. The first piston head 142 can be integral with or separately attached to the second cylinder 144.

Referring to FIG. 4B, in the example illustrated, the first cylinder 120 has a first cylinder inner surface 146, and the shaft 124 has a shaft outer surface 148 directed toward the first cylinder inner surface 146. The shaft outer surface 148 and the first cylinder inner surface 146 are spaced radially apart to form the first annular space 128 therebetween. The first piston head 142 is in sealed sliding engagement with the first cylinder inner surface 146 and with the shaft outer surface 148.

In the example illustrated, injection unit 110 includes a first pressure chamber 150 in the first cylinder 120 axially rearward of the piston 126 (including the first piston head 142) for urging the piston 126 toward the advanced position when pressurized. In the example illustrated, the first pressure chamber 150 is in the first annular space 128.

In the example illustrated, the shaft 124 comprises a generally cylindrical tube coaxial with the cylinder axis 122, and extends through the first pressure chamber 150. The first piston head 142 has a through-hole 154 coaxial with the cylinder axis 122 and extending between a front face 142a and a rear face 142b of the first piston head 142. In the example illustrated, the shaft 124 extends through the through-hole 154, with the shaft back end 124b axially rearward of first piston head 142, and the shaft front end 124a axially forward of the first piston head 142 and in the second cylinder 144 of the piston 126. In the example illustrated, the shaft back end 124b is axially rearward of and external the housing 112.

In the example illustrated, the injection unit 110 includes a second piston head 152 in the second cylinder 144 of the piston body 140. The second piston head 152 is axially fixed relative to the housing 112. In the example illustrated, the second piston head 152 is received in sealed sliding fit in an interior of the second cylinder 144, and is affixed to the shaft front end 124a (FIG. 4A). The second piston head 152 can be integral with or separately attached to the shaft 124.

Referring to FIG. 4B, in the example illustrated, when the moving piston 126 is in the advanced position, the first piston head 142 is axially proximate the second piston head 152. Referring to FIG. 4A, when the moving piston 126 is in the retracted position, the first piston head 142 is spaced away from the second piston head 152 toward the shaft back end 124b.

In the example illustrated, the injection unit 110 includes a second pressure chamber 156 axially forward of the first piston head 142 for urging the piston 126 toward the retracted position when pressurized. In the example illustrated, the second pressure chamber 156 is in the second cylinder 144 and bounded axially by the first and second piston heads 142, 152. In the example illustrated, the second pressure chamber 156 is in a second annular space 158 radially intermediate the shaft 124 and the second cylinder 144. In the example illustrated, the second piston head 152 has a radially outer seal structure 153 for providing sealed sliding engagement with the inner surface of the second cylinder 144, and which includes seals 153a and wipers 153b mounted circumferentially about the outer surface of the second piston head 152, and a rearward facing shoulder surface 153c extending radially outward of the outer surface of the shaft towards the inner surface of the second cylinder. In the example illustrated, the radially outer seal structure 153 of the second piston head 152 axially bounds a forward end of the second pressure chamber 156. The first piston head 142, in the example illustrated, has a radially inner seal structure 143 providing sealed sliding engagement with the outer surface of the shaft 124, and which includes seals 143a and wipers 143b mounted circumferentially to an inner surface of the first piston head 142, and a forward facing shoulder surface 143c extending radially inward of the inner surface of the second cylinder 144. In the example illustrated, the radially inner seal structure 143 of the first piston head 142 axially bounds a rearward end of the second pressure chamber 156. The second pressure chamber 156 can, in some instances, be pressurized to move the piston 126 to the maximum retracted position to facilitate maintenance or other work on the injection unit.

In the example illustrated, the second cylinder 144 has a second cylinder inner surface 160 directed toward and spaced radially apart from the shaft outer surface 148 to form the second annular space 158 therebetween. The second piston head 152 is in sealed sliding engagement with the second cylinder inner surface 160.

Referring to FIG. 4B, in the example illustrated, the shaft 124 serves as a conduit for fluid communication with the second pressure chamber and accommodates passage of a linear positioning sensor element along its axis for connection to the screw 116. In the example illustrated, the shaft 124 has an internal first fluid channel 162 extending between the first pressure chamber 150 and a first fluid port 164 for conducting pressurized fluid to and from the first pressure chamber 150. The shaft 124 has an internal second fluid channel 166 extending between the second pressure chamber 156 and a second fluid port 168 for conducting pressurized fluid to and from the second pressure chamber 156. In the example illustrated, the second fluid channel 166 extends through the first pressure chamber 150 for fluid communication with the second pressure chamber 156. In the example illustrated the first and second fluid ports 164, 168 are proximate the shaft back end 124*b*, and external the housing 112.

In the example illustrated, a cylinder cap 170 is mounted to the first cylinder back end 120*b*. In the example illustrated, the cylinder cap 170 is fixed to rotate with the first cylinder 120. The first pressure chamber 150 is bounded axially by the first piston head 142 and the cylinder cap 170 for accommodating pressurized fluid to exert an axial force against the piston 126 and urge the piston 126 toward the advanced position, with the pressurized fluid exerting a reactionary force against the cylinder cap 170.

In the example illustrated, a bearing assembly 172 is mounted between the housing 112 and the first cylinder 120. The bearing assembly 172 supports rotation of the first cylinder 120 relative to the housing 112, and the bearing assembly 172 transfers at least a portion of the reactionary force from the cylinder cap 170 to the housing 112.

In the example illustrated, the bearing assembly 172 includes a thrust bearing 174 for transferring at least a portion of the reactionary force from the cylinder cap 170 to the housing 112. The thrust bearing 174 is axially forward of the cylinder cap 170. In the example illustrated, when the piston 126 is in the advanced position, the thrust bearing 174 is axially forward of the rear face 142*b* of the first piston head 142 (and the first pressure chamber 150). In the example illustrated, the thrust bearing 174 is proximate the first cylinder front end 120*a*. In the example illustrated the thrust bearing 174 is proximate the housing front end 112*a*. In the example illustrated, the thrust bearing 174 is axially captive between a cylinder bearing surface 176 fixed relative to the first cylinder 120 and directed toward the first cylinder back end 120*b*, and a housing bearing surface 178 fixed relative to the housing 112 and directed toward the cylinder bearing surface 176. The cylinder bearing surface is, in the example illustrated, a rear facing shoulder of a lock ring secured to the front end of the first cylinder 120.

When the first pressure chamber 150 is pressurized, a force acts on the piston 126 to push the piston 126 forward. A reactionary force pushes in the opposite direction against the cylinder cap 170. This reactionary force can in some examples be in the range of 40 to 60 tons, and in the example illustrated, is about 50 tons. This reactionary force (pushing in the axially rearward direction) is transferred through the sidewall of the first cylinder and to the lock ring bearing surface 176, whereupon the force is then transferred to the housing via the thrust bearing 174.

Figure 5:
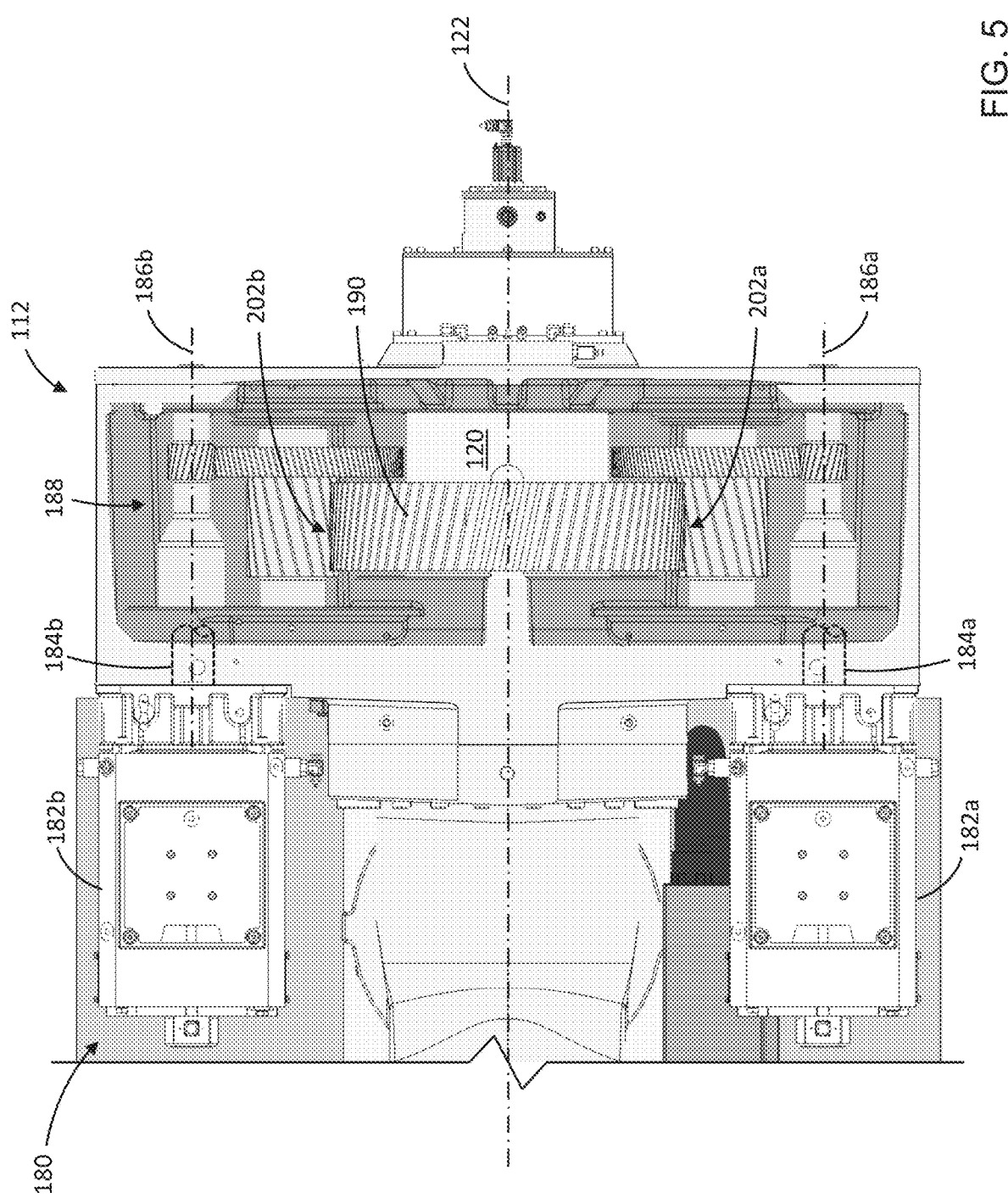
FIG. 5 is a cross-sectional plan view of a portion of the injection unit of FIG. 2, taken along line 5-5 of FIG. 3.

Referring to FIG. 5, in the example illustrated, a rotary drive 180 is mounted to the housing 112 for powering rotation of the first cylinder 120. The rotary drive 180 includes a first motor 182*a* having a first motor shaft 184*a* (shown in phantom lines in FIG. 5) rotatable about a first motor axis 186*a* that is parallel to the cylinder axis 122. In the example illustrated, the rotary drive 180 further includes second motor 182*b* having a second motor shaft 184*b* (shown in phantom lines in FIG. 5) rotatable about a second motor axis 186*b* that is parallel to the cylinder axis 122.

In the example illustrated, a gear train 188 is supported in the housing 112 for transmitting power from the rotary drive 180 to rotation of the first cylinder 120 about the cylinder axis 122. In the example illustrated, the gear train 188 includes a cylinder gear 190 mounted on the first cylinder 120 coaxial with the cylinder axis 122 (see also FIGS. 4A and 4B). The cylinder gear 190 is fixed to rotate with the first cylinder 120 for driving rotation thereof. In the example illustrated, the cylinder gear 190 includes gear teeth extending about a circumference of, and fixed relative to, the first cylinder 120.

Referring to FIG. 4A, in the example illustrated, the bearing assembly 172 includes at least one front bearing 192 proximate the first cylinder front end 120*a* and a rear bearing 194 spaced axially apart from the front bearing 192 toward the first cylinder back end 120*b*. In the example illustrated, the cylinder gear 190 is axially intermediate the front and rear bearings 192, 194, which may facilitate more favorable load distribution. In the example illustrated, the at least one front bearing 192 comprises the thrust bearing 174. In the example illustrated, the at least one front bearing 192 further comprises a roller bearing 196. In the example illustrated, the roller bearing 196 is axially intermediate the thrust bearing 174 and the rear bearing 194.

Referring to FIG. 4B, in the example illustrated, when the piston 126 is in the advanced position, the cylinder gear 190 and first pressure chamber 150 axially overlap, and the piston 126 is axially forward of the cylinder gear 190 (i.e. the rear face 142*b* of the first piston head 142 is axially forward of the cylinder gear 190). Referring to FIG. 4A, when the piston 126 is in the retracted position, the cylinder gear 190 and the piston 126 axially overlap, and the first pressure chamber 150 is axially rearward of the cylinder gear 190 (i.e. the rear face 142*b* of the first piston head 142 is axially rearward of the cylinder gear 190).

Figure 6:
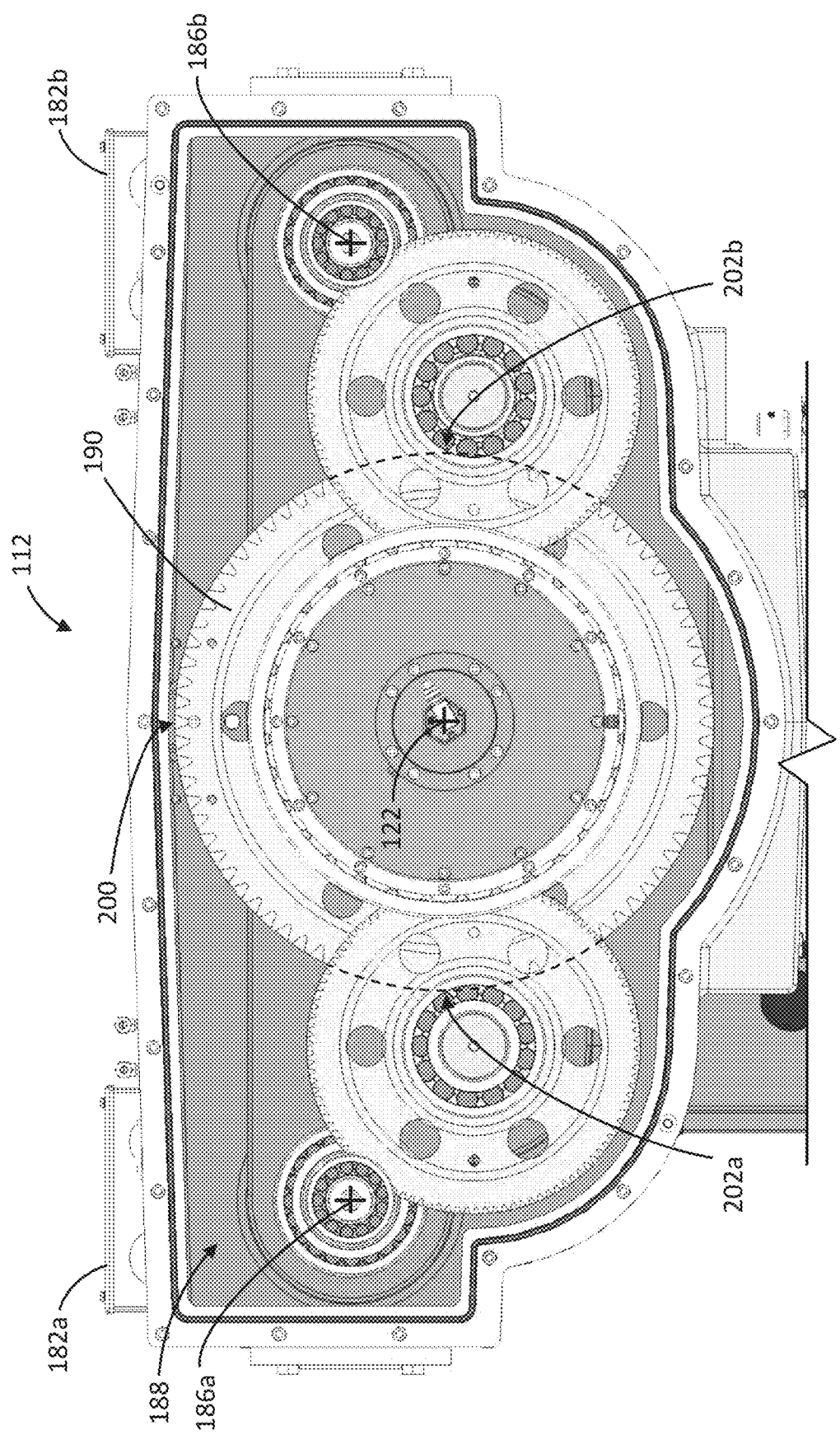
FIG. 6 is a rear view of a portion of the injection unit of FIG. 2, with a rear cover of a housing of the injection unit removed.

Referring to FIG. 6, in the example illustrated, the cylinder gear 190 has an uppermost extent 200 vertically above the cylinder axis 122, and opposed first and second lateral extents 202*a*, 202*b* on horizontally opposed sides of the cylinder axis 122. In the example illustrated, the first motor axis 186*a* is at an elevation below the uppermost extent 200 of the cylinder gear 190, and laterally beyond the first lateral extent 202*a* of the cylinder gear 190. In the example illustrated, the second motor axis 186*b* is at an elevation below the uppermost extent 200 of the cylinder gear 190, and laterally beyond the second lateral extent 202*b* of the cylinder gear 190.

Such a rotary drive configuration can facilitate a reduction in an overall height of the injection unit 110. This may facilitate shipment of the injection unit 110 in a standard shipping container (e.g. a standard ISO shipping container having a height of approximately 2.59 meters (102 inches)), without necessarily requiring disassembly of components of the injection unit 110, or dismounting of the injection unit from the base 102.

For example, in the example illustrated, the injection unit 110 is a two-stage injection unit with a 120 mm screw diameter for use on a 300 ton (clamp force) injection molding machine. Using a conventional motor and gear box configuration with one or two motors positioned above the gear box, the overall height of the machine is such that it cannot fit within the height restrictions of a standard shipping container (i.e. as defined by ISO 6346).

Referring to FIG. 4B, in the example illustrated, the injection unit further includes a gear oil chamber 206 internal the housing 112 for containing gear oil to lubricate the gear train 188. In the example illustrated, the gear oil chamber 206 includes a third annular chamber 208 positioned radially outward of an outer surface (second cylinder outer surface) 210 of the second cylinder 144 of the piston body, and radially inward (when the piston is in the retracted position) of the and the inner surface (first cylinder inner surface) 146 of the first cylinder 120. The third annular chamber 208 is axially forward of the first (moving) piston head 142. Engagement between inner spline teeth of the spline coupling 130 and outer spline teeth of the second cylinder outer surface 210 occurs, in the example illustrated, in the third annular chamber 208, and the gear oil in the third annular chamber 208 provides lubrication of the spline teeth engagement (reducing friction and wear) as the piston 126 translates between the advanced and retracted positions. In the example illustrated, the gear oil chamber 206, including the third annular chamber 208, is in fluid isolation of the first and second pressure chambers 150, 156. In the example illustrated, having the second pressure chamber 156 internal of the second cylinder 144 facilitates providing lubrication of the spline teeth engagement with a lubricating oil (e.g. gear oil) rather than an oil optimized for pressurized power transfer (e.g. hydraulic oil).

The invention claimed is:

1. An injection unit for an injection molding machine, comprising:
   a) a barrel for receiving a plasticizing screw, the barrel extending horizontally along an injection axis between a barrel front end and a barrel back end;
   b) a housing having a housing interior and an outer front face directed toward the barrel back end;
   b) a cylindrical body rotatably supported in the housing interior for rotational coupling with the plasticizing screw, the cylindrical body coaxial with the injection axis and fixed to rotate with the plasticizing screw;
   c) a gear train supported in the housing, the gear train including a central gear mounted about the cylindrical body coaxial with the injection axis and fixed to rotate with the cylindrical body, the central gear having an uppermost extent vertically above the injection axis and opposed first and second lateral extents on horizontally opposed sides of the injection axis;
   d) a rotary drive mounted to the housing for powering rotation of the plasticizing screw via the gear train, the rotary drive including a first motor having a first motor shaft rotatable about a first motor axis, the first motor axis parallel to the injection axis, the first motor axis at a first elevation below the uppermost extent of the central gear, and laterally outboard of the first lateral extent of the central gear on the first side of the injection axis.

2. The injection unit of claim 1, wherein the first motor is mounted to the outer front face of the housing with the first motor shaft protruding rearward of the first motor into the housing interior.

3. The injection unit of claim 2, wherein the rotary drive further includes a second motor having a second motor shaft rotatable about a second motor axis, the second motor axis parallel to the injection axis, the second motor axis at a second elevation below the uppermost extent of the central gear, and laterally outboard the second lateral extent of the central gear on the second side of the injection axis, opposite the first side.

4. The injection unit of claim 3, wherein the second motor is mounted to the outer front face of the housing with the first motor shaft protruding rearward of the first motor into the housing interior.

5. The injection unit of claim 4, wherein the first elevation and of the first motor shaft is generally equal to the second elevation of the second motor shaft.

6. The injection unit of claim 5, further comprising a gear oil chamber internal the housing for containing gear oil to lubricate the gear train.

7. The injection unit of claim 1, further comprising at least one front bearing mounted to the housing for rotationally supporting a body front end of the cylindrical body, and a rear bearing spaced axially apart from the front bearing for rotationally supporting a body back end of the cylindrical body, wherein the central gear is axially intermediate the front and rear bearings.

8. The injection unit of claim 1, wherein the cylindrical body comprises a fluid cylinder internal the cylindrical body, the fluid cylinder slidably receiving a piston for urging translation of the plasticizing screw, the piston fixed to rotate with the cylindrical body and translatable along the injection axis relative to the cylindrical body for urging translation of the piston along the injection axis between advanced and retracted positions.

9. The injection unit of claim 8, further comprising a pressure chamber in the fluid cylinder axially rearward of the piston for urging the piston toward the advanced position when pressurized.

10. An injection unit for an injection molding machine, comprising:
    a) a barrel for receiving a plasticizing screw, the barrel extending horizontally along an axis between a barrel front end and a barrel back end;
    b) a housing adjacent the barrel back end;
    c) a first cylinder within a cylindrical body rotatably supported in the housing for rotation about the axis;
    d) a shaft coaxial with the axis and axially fixed relative to the housing, the shaft having a shaft back end proximate a housing back end of the housing and a shaft front end spaced axially forward of the shaft back end;
    e) a piston slidably received in a first annular space radially intermediate a first inner surface of the first cylinder and an outer surface of the shaft, the piston including a second cylinder coaxial with the axis and having a second cylinder front end for connection to the plasticizing screw and a second cylinder back end spaced axially rearward of the second cylinder front end, the piston further including a first piston head received in sealed sliding fit in the first annular space and affixed to the second cylinder back end, and the piston fixed to rotate with the first cylinder and translatable relative to the first cylinder along the axis between advanced and retracted positions;
    f) a first pressure chamber in the first annular space axially rearward of the first piston head for urging the piston toward the advanced position when pressurized;
    g) a second piston head received in sealed sliding fit in an interior of the second cylinder and affixed to the shaft front end; and
    h) a second pressure chamber axially forward of the first piston head and in a second annular space radially intermediate the shaft and the second cylinder, the second pressure chamber bounded axially by the first and second piston heads for urging the piston toward the retracted position when pressurized.

11. The injection unit of claim 10, wherein the second cylinder has a second cylinder inner surface directed toward and spaced radially apart from the shaft outer surface to form the second annular space therebetween, and wherein the second piston head is in sealed sliding engagement with the second cylinder inner surface.

12. The injection unit of claim 10, wherein when the piston is in the advanced position, the first piston head is axially proximate the second piston head, and when the piston is in the retracted position, the first piston head is spaced away from the second piston head toward the shaft back end.

13. The injection unit of claim 10, wherein the shaft has an internal first fluid conduit extending between the first pressure chamber and a first fluid port for conducting pressurized fluid to and from the first pressure chamber, and an internal second fluid conduit extending between the second pressure chamber and a second fluid port for conducting pressurized fluid to and from the second pressure chamber.

14. The injection unit of claim 10, further comprising a gear train supported in the housing for transmitting power from a rotary drive to rotation of the first cylinder about the axis, and a gear oil chamber internal the housing for containing gear oil to lubricate the gear train, and wherein the piston is fixed to rotate with the first cylinder through a spline coupling therebetween, the spline coupling in fluid communication with the gear oil chamber for lubrication thereof.

15. The injection unit of claim 10, further comprising a cylinder cap mounted to a first cylinder back end of the first cylinder and fixed to rotate with the first cylinder, the first pressure chamber bounded axially by the first piston head and the cylinder cap.

16. An injection unit for an injection molding machine, comprising:
   a) a barrel for receiving a plasticizing screw, the barrel extending horizontally along an axis between a barrel front end and a barrel back end;
   b) a housing adjacent the barrel back end;
   c) a first cylinder within a cylindrical body rotatably supported in the housing for rotation about the axis;
   d) a piston slidably received in the first cylinder, the piston including a second cylinder having a second cylinder front end for connection to the plasticizing screw and a second cylinder back end spaced axially rearward of the second cylinder front end, the piston further including a first piston head in the first cylinder and affixed to the second cylinder back end, and the piston fixed to rotate with the first cylinder and translatable relative to the first cylinder along the axis between advanced and retracted positions;
   e) a first pressure chamber in the first cylinder axially rearward of the first piston head for urging the piston toward the advanced position when pressurized; and
   f) a second pressure chamber in the second cylinder axially forward of the first piston head for urging the piston toward the retracted position when pressurized.

17. The injection unit of claim 16, further comprising a second piston head in the second cylinder and axially fixed relative to the housing, the second pressure chamber bounded axially by the first and second piston heads.

18. The injection unit of claim 17, further comprising a shaft coaxial with the axis and axially fixed relative to the housing, the shaft extending through the first pressure chamber and a through-hole in the first piston head between a shaft back end axially rearward of the first piston head and a shaft front end axially forward of the first piston head and in the second cylinder, the second piston head affixed to the shaft front end.

19. The injection unit of claim 18, wherein the piston is slidably received in a first annular space radially intermediate the first cylinder and the shaft, and the first pressure chamber is in the first annular space.

20. The injection unit of claim 18, wherein the second pressure chamber is in a second annular space radially intermediate the shaft and the second cylinder.

\* \* \* \* \*